United States Patent
Kimura

(10) Patent No.: US 10,696,209 B2
(45) Date of Patent: Jun. 30, 2020

(54) VEHICLE LAMP TOOL AND METHOD FOR CONTROLLING VEHICLE LAMP TOOL

(71) Applicant: STANLEY ELECTRIC CO., LTD., Meguro-ku, Tokyo (JP)

(72) Inventor: Yota Kimura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/485,546

(22) PCT Filed: Feb. 8, 2018

(86) PCT No.: PCT/JP2018/004331
§ 371 (c)(1),
(2) Date: Aug. 13, 2019

(87) PCT Pub. No.: WO2018/150995
PCT Pub. Date: Aug. 23, 2018

(65) Prior Publication Data
US 2019/0366909 A1 Dec. 5, 2019

(30) Foreign Application Priority Data
Feb. 20, 2017 (JP) .................. 2017-029282

(51) Int. Cl.
*B60Q 1/115* (2006.01)
*B62J 6/02* (2020.01)
(Continued)

(52) U.S. Cl.
CPC .............. *B60Q 1/115* (2013.01); *B62J 6/02* (2013.01); *B60Q 2200/38* (2013.01);
(Continued)

(58) Field of Classification Search
CPC .............. B60Q 1/115; B60Q 2300/136; B60Q 2200/38; B62J 6/02; B62J 45/4151; B62J 45/40; B62J 99/00; B62J 6/00
See application file for complete search history.

(56) References Cited

U.S. PATENT DOCUMENTS 10,099,602 B2   10/2018  Yatsuda et al.
2014/0129081 A1*  5/2014  Ehlgen ................. G01M 11/068
                                                701/36
(Continued)

FOREIGN PATENT DOCUMENTS

JP    2005343413 A   12/2005
JP    2010149836 A    7/2010
(Continued)

OTHER PUBLICATIONS

International Search Report (ISR) (and English language translation thereof) dated May 1, 2018 issued in International Application No. PCT/JP2018/004331.
(Continued)

*Primary Examiner* — Kevin Quarterman
(74) *Attorney, Agent, or Firm* — Holtz, Holtz & Volek PC

(57) ABSTRACT

A vehicle lamp tool providing a controller which calculates the luminance distribution of light distribution pattern, an optical device which generates light distribution pattern in an illuminatable area D and a first driving circuit which drives the optical device. The controller transmits a first light distribution correction signal for correcting the inclination of a current light distribution pattern to the first driving circuit if the inclination angle of a vehicle with respect to vertical direction indicated by a detection signal received from a vehicle height sensor is equal to or less than a threshold value. The first driving circuit transmits a first correction driving signal based on the first light distribution correction signal to the optical device. The optical device drives an LD and a light deflector to correct the current light distribution pattern.

8 Claims, 4 Drawing Sheets

(51) Int. Cl.
*B62J 45/40* (2020.01)
*B62J 45/415* (2020.01)

(52) U.S. Cl.
CPC ......... *B60Q 2300/136* (2013.01); *B62J 45/40* (2020.02); *B62J 45/4151* (2020.02)

(56) References Cited

U.S. PATENT DOCUMENTS

| | | | |
|---|---|---|---|
| 2015/0073654 A1* | 3/2015 | Foltin | B60Q 1/115 701/36 |
| 2015/0142275 A1* | 5/2015 | Yamazaki | B60Q 1/115 701/49 |
| 2015/0151669 A1* | 6/2015 | Meisner | G08G 1/161 701/49 |
| 2016/0167567 A1* | 6/2016 | Foltin | B60Q 1/085 315/82 |
| 2016/0290583 A1* | 10/2016 | Suwa | B62J 6/02 |

FOREIGN PATENT DOCUMENTS

| | | |
|---|---|---|
| JP | 2015016794 A | 1/2015 |
| JP | 2015153646 A | 8/2015 |

OTHER PUBLICATIONS

Written Opinion dated May 1, 2018 issued in International Application No. PCT/JP2018/004331.

* cited by examiner

VEHICLE LAMP TOOL AND METHOD FOR CONTROLLING VEHICLE LAMP TOOL

TECHNICAL FIELD

The present invention relates to a vehicle lamp tool and a method for controlling a vehicle lamp tool.

BACKGROUND ART

There has been developed a light distribution variable headlamp (ADB: Adaptive Driving Beam) which partially blocks high beam when an imaging camera, which images the area ahead of a vehicle, detects a preceding vehicle or an oncoming vehicle so as to prevent the high beam of a vehicle from dazzling the driver of the preceding vehicle or the oncoming vehicle at night. Further, there has been known a technique for changing the luminance distribution or the illumination range of a light distribution pattern according to surrounding environments or road situations.

For example, a vehicle lamp tool is mainly constituted of an excitation light source, a light deflector, which scans, in a two-dimensional manner (in a horizontal direction and a vertical direction), an excitation light ray from the excitation light source that has been condensed by a condensing lens, a wavelength conversion member on which a two-dimensional image corresponding to a predetermined light distribution pattern is drawn by the excitation light ray, and a projection lens which projects in front the two-dimensional image drawn on the wavelength conversion member (refer to Japanese Patent Application Laid-Open No. 2015-153646).

The light deflector is a 1 axis non-resonant-1 axis resonance type, and is placed in a state in which a first axis is included in a vertical plane and a second axis is included in a horizontal plane. This enables the light deflector to easily form a predetermined light distribution pattern that is wide in the horizontal direction and narrow in the vertical direction, which is required of a vehicle lamp tool.

Further, the vehicle lamp tool has a vehicle speed sensor, and determines whether the vehicle is traveling or at a halt based on a detection result of the vehicle speed sensor. A MEMS power circuit controls a piezoelectric actuator of the light deflector to change the light distribution pattern according to whether it is determined that the vehicle is traveling or at a halt.

SUMMARY OF INVENTION

Technical Problem

A conventional vehicle lamp tool has been adapted mainly for four-wheel vehicles (automobiles), and therefore has a function for changing a light distribution pattern according to a slope or a curve. However, a four-wheel vehicle hardly inclines from an upright state, so that the need for adjusting the light distribution pattern according to the inclination of a vehicle has been low.

However, in the case of a two-wheeled vehicle (motorcycle), the vehicle is considerably inclined at a curve or the like in some cases. This has been posing a problem in that a conventional vehicle lamp tool cannot make a light distribution pattern follow the inclination of the vehicle.

Further, even in the case of a four-wheel vehicle, there has been a problem also in that, if, for example, a road itself has an inclination (bank angle), then a conventional vehicle lamp tool cannot make a light distribution pattern follow the inclination of the vehicle.

The present invention has been made with a view of the circumstances described above, and it is an object of the invention to provide a vehicle lamp tool and a method for controlling a vehicle lamp tool which can promptly change a light distribution pattern according to an inclination of a vehicle with respect to a vertical direction.

Solution to Problem

According to a first aspect of the invention, there is provided a vehicle lamp tool including: a light distribution calculation unit which calculates the luminance distribution of a light distribution pattern generated in an area ahead of a vehicle; a light distribution generation unit which has a light source, a light deflector composed of a mirror section that reflects, in a predetermined direction, the light emitted from the light source and an actuator which rotates the mirror section about a rotation axis, a fluorescent body which lets the light reflected by the mirror section enter and emits fluorescence, and a projection optical unit which projects the light emitted from the fluorescent body, the light distribution generation unit generating the light distribution pattern in an illumination area, to which the light from the projection optical unit is irradiated, based on the luminance distribution calculated by the light distribution calculation unit; and a first driving unit which generates a driving signal based on the luminance distribution calculated by the light distribution calculation unit and drives the light distribution generation unit according to the driving signal. The vehicle lamp tool further includes inclination angle detection unit which is installed at a predetermined position of a vehicle and which detects an inclination angle of the vehicle with respect to a vertical direction The light distribution calculation unit transmits a first light distribution correction signal for correcting the inclination of a current light distribution pattern to the first driving unit in the case where the inclination angle of a detection signal received from the inclination angle detection unit is equal to or less than a predetermined threshold value, the first driving unit transmits a first correction driving signal based on the first light distribution correction signal to the light distribution generation unit, and the light distribution generation unit drives the light source and the light deflector based on the first correction driving signal thereby to correct the current light distribution pattern.

In the vehicle lamp tool according to the present invention, the first driving unit generates a driving signal based on the luminance distribution of a light distribution pattern calculated by the light distribution calculation unit, and drives the light distribution generation unit to generate a light distribution pattern in an illuminatable area ahead of a vehicle.

For example, if the vehicle is inclined with respect to the vertical direction at a curve or the like, then a detection signal of the inclination angle detection unit is transmitted to the light distribution calculation unit. Upon receipt of a detection signal indicating that the inclination angle is equal to or less than a threshold value, the light distribution calculation unit transmits the first light distribution correction signal to the first driving unit, and the first driving unit drives the light distribution generation unit according to a first correction driving signal. Thus, the inclination of the light distribution pattern is corrected (an image correction, which will be described later). The processing speed of a correction based on an image is fast, so that the light distribution pattern can be promptly changed according to the inclination of the vehicle.

Preferably, the vehicle lamp tool according to the first aspect of the invention further includes: a mechanical rotation unit which is installed to the light distribution generation unit and which rotates the light distribution generation unit; and a second driving unit which drives the mechanical rotation unit, wherein the light distribution calculation unit transmits a second light distribution correction signal for correcting the inclination of a current light distribution pattern to the first driving unit and the second driving unit in the case where the inclination angle of the detection signal received from the inclination angle detection unit is larger than the threshold value, the first driving unit and the second driving unit transmit a second correction driving signal based on the second light distribution correction signal to the light distribution generation unit, and the light distribution generation unit drives the light source, the light deflector, and the mechanical rotation unit based on the second correction driving signal to correct the current light distribution pattern.

According to the arrangement, the light distribution calculation unit transmits the second light distribution correction signal to the first driving unit and the second driving unit if the inclination angle of the detection signal received from the inclination angle detection unit is larger than the threshold value. The first driving unit and the second driving unit drive the light distribution generation unit based on the second correction driving signal. Further, the light distribution generation unit drives the light source, the light deflector, and the mechanical rotation unit to correct the inclination of a light distribution pattern (the mechanical rotation correction, which will be described later). Thus, if the inclination of a vehicle becomes large, a light distribution pattern can be promptly changed by combining the two types of corrections.

Further, preferably, in the vehicle lamp tool according to the first aspect of the invention, the inclination angle detection unit is composed of a pair of vehicle height sensors which are installed to footrests on which both feet of a rider are placed and which detect the distance between the positions where the inclination angle detection unit are installed and a road surface in the case where a vehicle is a two-wheeled vehicle.

If the vehicle is a two-wheeled vehicle, then a pair of vehicle height sensors are installed, as the inclination angle detection unit, on the footrests on which both feet of the rider are placed. The vehicle height sensors are capable of measuring the distance between the installation positions thereof and a road surface by ultrasonic waves or the like. The footrests are usually horizontal with respect to a road surface, so that the inclination of the vehicle can be easily detected from the numerical difference between the vehicle height sensors.

Further, in the vehicle lamp tool according to the first aspect of the invention, the inclination angle detection unit includes preferably gyro sensors installed on the left and right central axes of the vehicle.

Installing the gyro sensors on the left and right central axes of the vehicle makes it possible to detect the rotational angular velocity of the vehicle with respect to the vertical direction (the axis of rotation).

According to a second aspect of the invention, there is provided a method for controlling a vehicle lamp tool, including: light distribution calculation processing for calculating the luminance distribution of a light distribution pattern generated in an area ahead of a vehicle; light distribution generation processing for generating the light distribution pattern according to the luminance distribution calculated by the light distribution calculation processing in an illumination area to which light is irradiated; inclination angle calculation processing for calculating an inclination angle of a vehicle with respect to the vertical direction; threshold value determination processing for determining whether the inclination angle acquired by the inclination angle calculation processing is equal to or less than a predetermined threshold value; and first correction processing for correcting, as a first correction value for correcting the inclination of the light distribution pattern, the inclination angle acquired by the inclination angle calculation processing in the case where a determination result of the threshold value determination processing is equal to or less than the threshold value, wherein the light distribution calculation processing and the light distribution generation processing are carried out based on the first correction value thereby to correct the light distribution pattern in the first correction processing.

In the method for controlling the vehicle lamp tool according to the present invention, the luminance distribution of a light distribution pattern generated in an area ahead of a vehicle is calculated by the light distribution calculation processing, and a light distribution pattern is generated in an illuminatable area based on the luminance distribution by the light distribution generation processing.

For example, if a vehicle inclines with respect to the vertical direction at a curve or the like, then the inclination angle of the vehicle with respect to the vertical direction is calculated by the inclination angle calculation processing, and it is determined by the threshold value determination processing whether a determination result is equal to or less than a threshold value. If the determination result is equal to or less than the threshold value, then the inclination angle is defined as the first correction value. Then, the light distribution calculation processing and the light distribution generation processing are carried out again based on the first correction value to generate a new light distribution pattern with a corrected inclination. This enables a light distribution pattern to be promptly changed according to the inclination of the vehicle.

Preferably, the method for controlling a vehicle lamp tool according to the second aspect of the invention further includes: rotation correction processing for correcting the inclination of the light distribution pattern by the rotation of mechanical rotation unit; and second correction value calculation processing for calculating a second correction value for correcting the inclination of the light distribution pattern in the case where a determination result of the threshold value determination processing is larger than the threshold value, wherein the light distribution calculation processing, the light distribution generation processing, and the rotation correction processing are carried out based on the second correction value calculated by the second correction value calculation processing so as to correct the light distribution pattern.

With this arrangement, if a vehicle inclines with respect to the vertical direction, then the inclination angle calculation processing and the threshold value determination processing are carried out, and if a determination result of the threshold value determination processing is larger than a threshold value, then the second correction value calculation processing is carried out. Then, the light distribution calculation processing, the light distribution generation processing, and the rotation correction processing are carried out based on the second correction value calculated by the second correction value calculation processing. A light distribution pattern is corrected also by the rotation of the mechanical rotation unit, thus making it possible to promptly change the light distribution pattern also in the case where a vehicle is considerably inclined.

DESCRIPTION OF EMBODIMENTS

Figure 1:
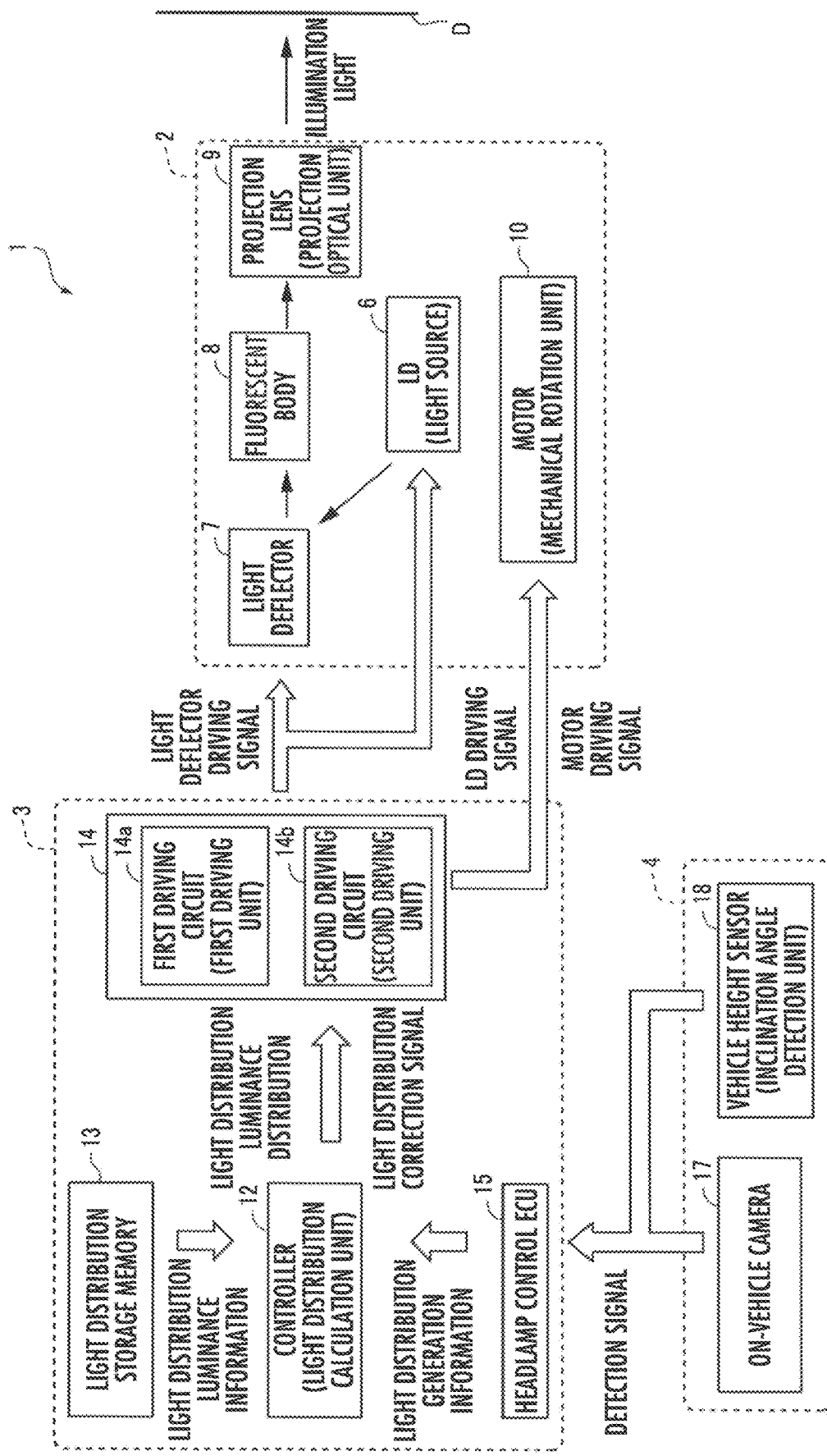
FIG. 1 is a block diagram of a vehicle lamp tool according to an embodiment of the present invention.

FIG. 1 is an overall configuration diagram of a vehicle lamp tool 1 according to an embodiment of the present invention. The vehicle lamp tool 1 is a lamp tool (headlamp) to be mounted on a two-wheeled vehicle or a four-wheel vehicle, and is constituted primarily of an optical device 2 and a control device 3. Although FIG. 1 illustrates a sensor unit 4, the sensor unit 4 is installed separately from the vehicle lamp tool 1.

First, the optical device 2 (corresponding to the light distribution generation unit in the present invention) is composed of an LD (Laser Diode) 6, a light deflector 7, a fluorescent body 8, and a projection lens 9. The optical device 2 is placed at the front part of the vehicle lamp tool 1 and is capable of mechanically rotating the optical device 2 by a motor 10 installed thereto.

The LD 6 (the light source in the present invention) is, for example, a blue laser diode having a 450-nm central emission wavelength. The turning on/off and the light intensity of the LD 6 are controlled by a first driving circuit 14a, which will be described later. A light emitting diode (LED) may be used in place of the LD 6 insofar as sufficient light intensity can be secured.

The light deflector 7 is provided with a mirror section that can be inclined in a two-dimensional manner and is capable of freely changing the reflection direction of light incident upon the mirror section. In the present embodiment, the mirror section reflects the laser light emitted from the LD 6 toward the fluorescent body 8. The light deflector 7 is also controlled by the first driving circuit 14a.

As the light deflector 7, a publicly known mirror described in, for example, Japanese Patent Application Laid-Open No. 2005-128147 or Japanese Patent No. 4092283 can be applied.

The fluorescent body 8 is a member that emits fluorescence when light is irradiated thereto. More specifically, when the laser light (blue excitation light) reflected by the mirror section of the light deflector 7 is irradiated to the fluorescent body 8, the fluorescence is excited, and yellow light, which is complementary to the blue light, is emitted. Hence, white light resulting from the mixture of the blue light and the yellow light is emitted from the fluorescent body 8.

The projection lens 9 (the projection optical unit in the present invention) is placed between the fluorescent body 8 and an illuminatable area D, in which a light distribution pattern is to be generated. The light (white light) emitted from the fluorescent body 8 passes through the projection lens 9 and a light-transmittant cover of a casing, not illustrated, and forms an image in the illuminatable area D ahead of the vehicle.

The motor 10 (the mechanical rotation unit in the present invention) is a stepping motor installed to the optical device 2, and the rotation angle of the motor 10 is controlled by a second driving circuit 14b, which will be described later.

Next, the control device 3 is constituted of a controller 12, a light distribution storage memory 13, a driving circuit 14, and a headlamp control ECU (Engine Control Unit) 15.

The controller 12 (the light distribution calculation unit in the present invention) acquires the information required to generate a light distribution pattern (light distribution generation information) from the headlamp control ECU 15. Further, the controller 12 reads a current light distribution pattern (light distribution luminance information) from the light distribution storage memory 13, and calculates the luminance distribution of a new light distribution pattern. Thereafter, the controller 12 transmits, to the driving circuit 14, the light distribution luminance distribution for irradiating light to the illuminatable area D according to the new light distribution pattern.

The light distribution storage memory 13 includes a RAM for temporarily storing data to be used when the controller 12 carries out calculation, a ROM which stores program data to be executed by the controller 12, a predetermined non-volatile storage device, and the like.

The driving circuit 14 is composed of the first driving circuit 14a and the second driving circuit 14b. The first driving circuit 14a (the first driving unit in the present invention) controls the drive power to be supplied to the LD 6 according to an LD driving signal thereby to turn on/off the LD 6 and change the light intensity thereof. Further, the first driving circuit 14a supplies a light deflector driving signal to an actuator of the light deflector 7 to control the inclination mode of the mirror section.

The second driving circuit 14b (the second driving unit in the present invention) controls the rotation of the motor 10 by motor driving signals. More specifically, if a vehicle inclines with respect to the vertical direction, then the motor 10 is always run to set the illuminatable area D back to an original horizontal direction.

The headlamp control ECU 15 acquires the information of an image taken by an on-vehicle camera 17 of the sensor unit 4 and the information of distance (detection signal) of vehicle height sensors 18, which will be described later, converts the acquired information into signals required for generating a light distribution pattern, and transmits the converted signals to the controller 12.

The sensor unit 4 is composed of the on-vehicle camera 17 and the vehicle height sensors 18. The on-vehicle camera 17 is simply required to be capable of imaging an area ahead of the vehicle, and is installed at a position where the on-vehicle camera 17 does not rotate together with the optical device 2 when the optical device 2 rotates. For example, a digital camera capable of imaging visible light and infrared rays may be used, or a camera adapted to monitor pedestrians and obstacles mainly to prevent the collisions of vehicles may be used also as the on-vehicle camera 17.

The vehicle height sensors 18 (the inclination angle detection unit in the present invention) are sensors which are installed at predetermined positions of the vehicle and which can detect the inclination angle of the vehicle with respect to the vertical direction. The vehicle height sensors 18 of the present embodiment acquire the information of the distance between the sensor installation positions and a road surface by ultrasonic waves or infrared rays, and transmit a detection signal to the headlamp control ECU 15.

Figure 2A:
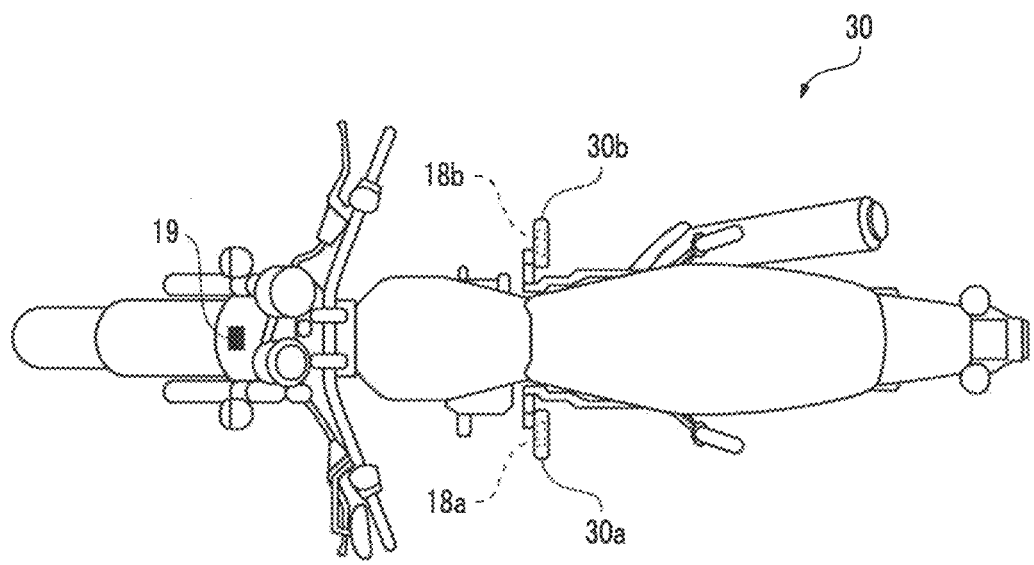
FIG. 2A is a diagram illustrating various types of sensors installed to a vehicle (viewed from above)
Figure 2B:
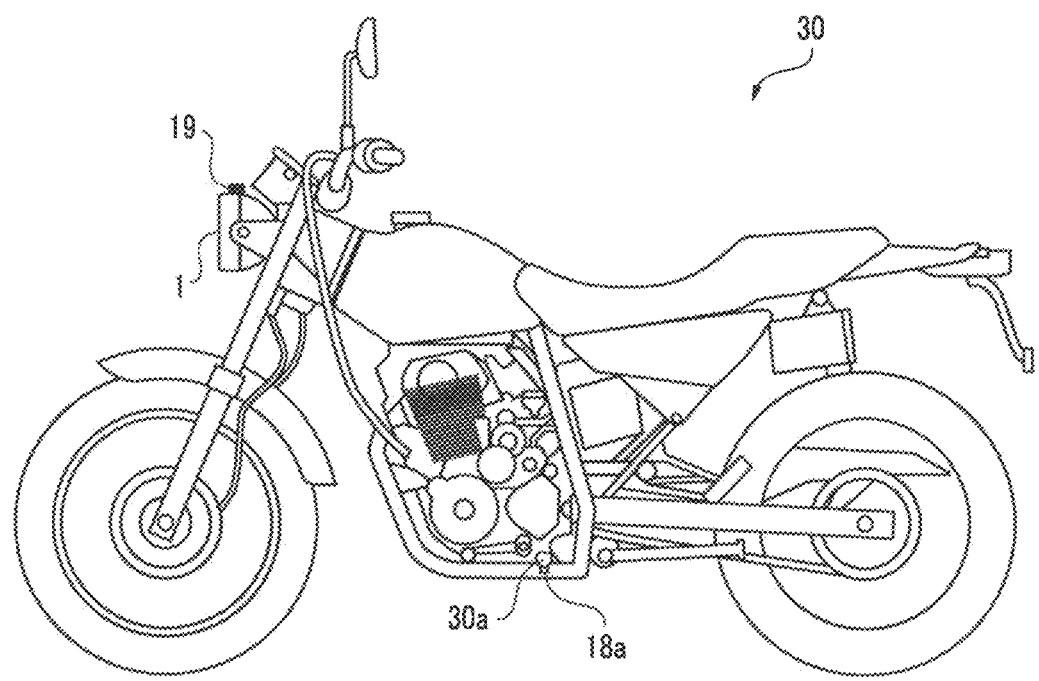
FIG. 2B is a diagram illustrating the various types of sensors installed to the vehicle (viewed from left)

FIG. 2A and FIG. 2B illustrate various types of sensors installed to a vehicle (a motorcycle 30).

First, FIG. 2A is a diagram illustrating the motorcycle 30 observed from above. The foregoing vehicle height sensors 18 are attached to the lower surfaces of step sections 30*a* and 30*b* (the footrests in the present invention) on which a rider places his or her feet. More specifically, a left vehicle height sensor 18*a* is installed to the step section 30*a* on the left foot side of the rider, and a right vehicle height sensor 18*b* is installed to the step section 30*b* on the right foot side.

The vehicle height sensors 18*a* and 18*b* measure the distance between the sensor installation positions and a road surface by, for example, ultrasonic waves or infrared rays. The detection values of these sensors are transmitted as detection signals to the headlamp control ECU 15, and the inclination of the motorcycle 30 in a left-right direction with respect to the vertical direction is calculated from a difference in distance. Then, a light distribution pattern is regenerated to correct the inclination.

To acquire the inclination of the motorcycle 30 in the left-right direction, a gyro sensor (angular velocity sensor corresponding to the inclination angle detection unit in the present invention) or an acceleration sensor may be used. The vehicle height sensors 18*a* and 18*b* and a gyro sensor 19 are preferably installed at positions which are on left and right central axes of the motorcycle 30 and at which a largest displacement takes place (a highest possible position away from a road surface).

As illustrated in FIG. 2A or in FIG. 2B illustrating the motorcycle 30 viewed from left, the gyro sensor 19 is installed on the upper surface of the vehicle lamp tool 1 in the present embodiment. Alternatively, the gyro sensor 19 may be placed inside a rotating mechanism of the optical device 2.

In particular, the gyro sensor 19 can detect the inclination of the motorcycle 30 in the case of, for example, the presence of an inclination (bank angle) of a road itself. Providing either the foregoing vehicle height sensors 18 (the vehicle height sensors 18*a* and 18*b*) or the gyro sensor 19 is sufficient for detecting the inclination of the motorcycle 30 in the left-right direction.

Further, the motorcycle 30 inclines in a longitudinal direction when, for example, sudden braking is applied, in some cases. In such a case, the light distribution pattern has to be corrected so as to correct the inclination of the motorcycle 30 in the longitudinal direction.

If the sensors are installed in the vicinity of tires (e.g. suspension sections), then the sensors may be affected by a step or the like of a road surface. For this reason, the sensors are preferably installed on a body section where the vehicle lamp tool 1 inclines in the longitudinal direction. As illustrated in FIG. 2A and FIG. 2B, the gyro sensor 19 installed on the upper surface of the vehicle lamp tool 1 can detect the inclination of the motorcycle 30 in the longitudinal direction.

To detect the inclination of the motorcycle 30 in the longitudinal direction and to carry out control to correct a light distribution pattern, the gyro sensor 19 is preferably placed inside the vehicle lamp tool 1, especially inside the rotating mechanism of the optical device 2. There are cases where the motorcycle 30 inclines in the left-right direction and the longitudinal direction at the same time. The gyro sensor 19 can measure an inclination with respect to the axis of the earth, thus enabling a light distribution pattern to be corrected.

Figure 3A:
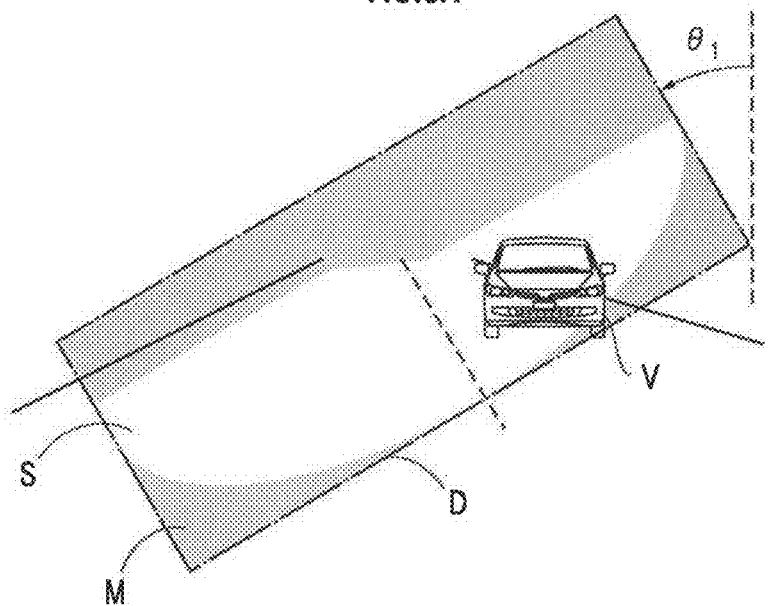
FIG. 3A is a diagram illustrating a light distribution pattern in the case where the vehicle is considerably inclined with respect to the vertical direction (1)
Figure 3B:
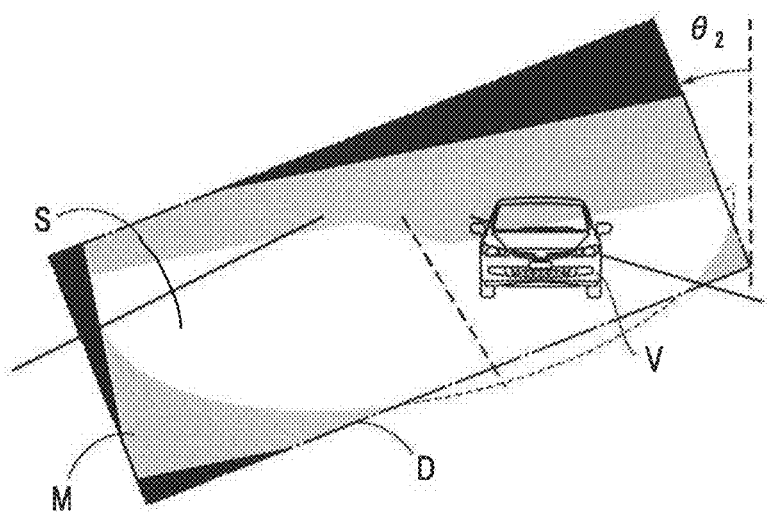
FIG. 3B is a diagram illustrating a light distribution pattern in the case where the vehicle is considerably inclined with respect to the vertical direction (2)
Figure 3C:
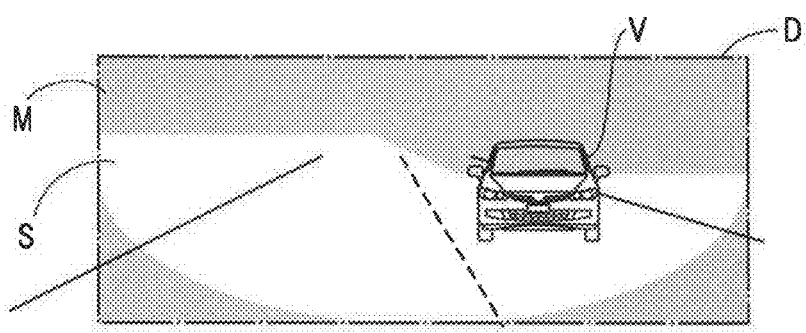
FIG. 3C a diagram illustrating a light distribution pattern in the case where the vehicle is considerably inclined with respect to the vertical direction (3)

Referring now to FIG. 3A to FIG. 3C, a description will be given of a light distribution pattern generated in the illuminatable area D in the case where the vehicle is considerably inclined with respect to the vertical direction.

If the motorcycle 30 inclines by an angle $\theta_1$ to the left with respect to the vertical direction, then the illuminatable area D in which a light distribution pattern is to be generated is rotated by the same angle, as illustrated in FIG. 3A. The illuminatable area D is the maximum range in which the mirror section of the light deflector 7 can be inclined, and the uncolored part in the illuminatable area D denotes an illumination area S to which light is irradiated and which has a predetermined luminance. Further, the colored part in the illuminatable area D denotes a masked area M shielded from light.

Referring to FIG. 3A, as the illuminatable area D is rotated, the light distribution pattern (the illumination area S+the masked area M) is rotated, so that the windshield of an oncoming vehicle V may be irradiated by light (high beam or the like), thus dazzling the driver of the oncoming vehicle V in some cases. Therefore, the vehicle lamp tool 1 acquires the information of the inclination angle (the angle $\theta_1$) of the vehicle in the vertical direction and carries out an image correction and a mechanical rotation correction to restore an original inclination of the light distribution pattern.

More specifically, the controller 12 transmits a light distribution correction signal to the driving circuit 14, and the first driving circuit 14*a* updates the LD driving signal to the LD 6 and a light deflector driving signal to the light deflector 7 based on the light distribution correction signal (refer to FIG. 1). Thus, the image correction, i.e., the regeneration of the light distribution pattern, is carried out, causing the light distribution pattern to rotate in the original direction.

Further, the second driving circuit 14*b* updates the motor driving signal to the motor 10 based on the light distribution correction signal. Thus, the mechanical rotation correction by the motor 10, i.e., the mechanical rotation of the illuminatable area D, is carried out. In general, the image correction is processed faster than the mechanical rotation correction, so that the light distribution pattern approaches sooner to the original horizontal direction, as illustrated in FIG. 3B.

FIG. 3B illustrates a light distribution pattern in a substantially horizontal state. In this case, the windshield of the oncoming vehicle V is mostly included in the masked area M of the light distribution pattern, so that the driver of the oncoming vehicle V will not be dazzled by high beam or the like. The illuminatable area D has still been rotated only by an angle $\theta_2$, so that the light distribution pattern is in a state in which the light distribution pattern has been partially cut off.

After that, the rotation of the light distribution pattern by the image correction soon finishes, setting the light distribution pattern in the horizontal state. Then, the motor 10 causes the illuminatable area D to rotate in a reverse direction by the angle $\theta_2$, so that the illuminatable area D is set in a horizontal state, thus placing the light distribution pattern within the illuminatable area D (refer to FIG. 3C).

As described above, in the case where the motorcycle 30 is considerably inclined in the vertical direction, and the inclination angle is detected by the vehicle height sensors 18, both the image correction and the mechanical rotation correction are carried out by the driving circuit 14.

Although the mechanical rotation correction made by the motor 10 is advantageous in that a correction can be made even in the case of a great inclination of a vehicle, relatively a longer time is required for the correction because of the mechanical operation. On the other hand, since the image correction permits a quick correction of a light distribution pattern, an inclination change can be promptly followed in changing the light distribution pattern by combining the image correction and the mechanical rotation correction.

If the inclination of the motorcycle 30 with respect to the vertical direction is smaller than a threshold value (e.g. if the inclination angle θ is 5°), then only the image correction may be required. This will be described in more detail.

Figure 4:
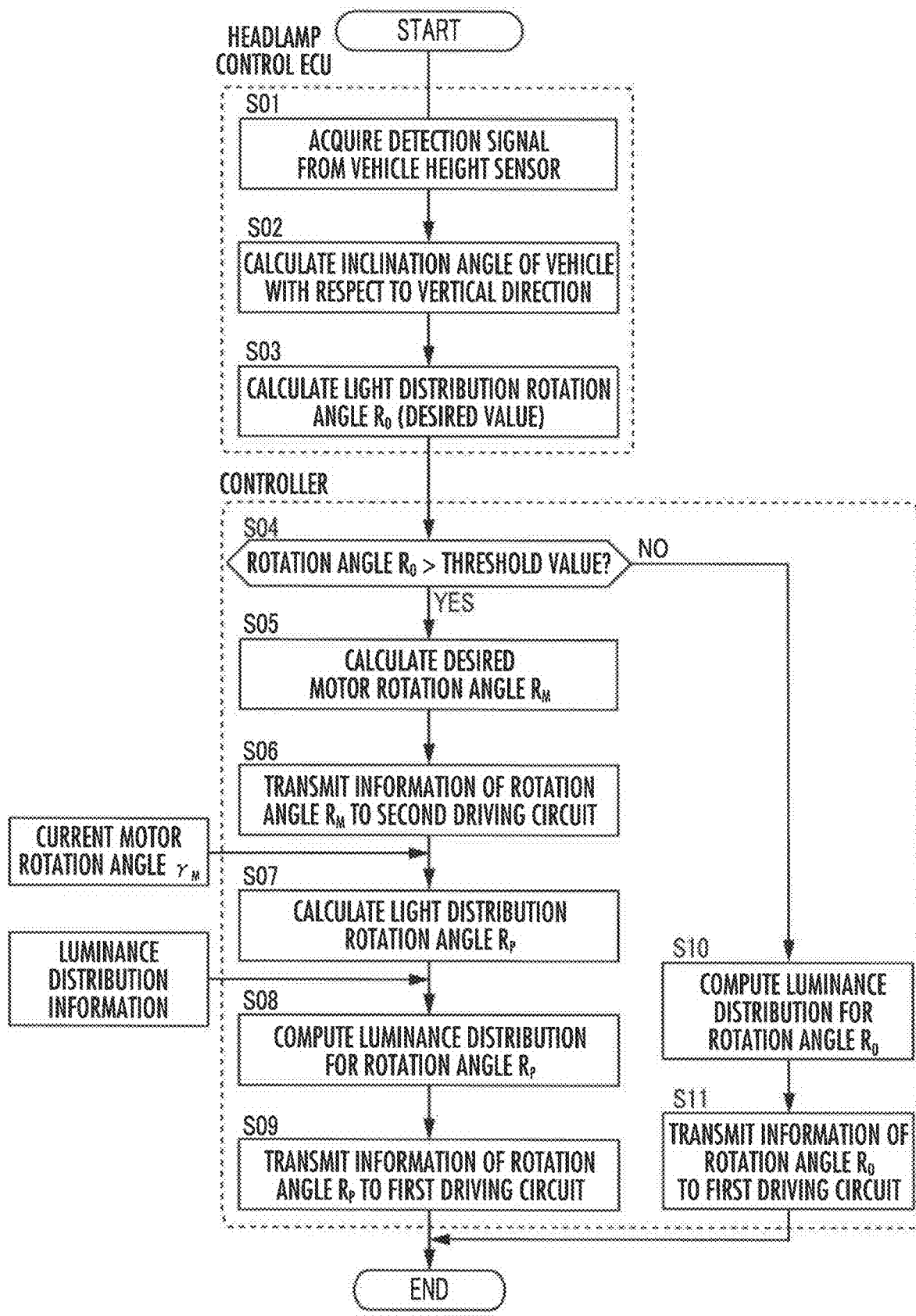
FIG. 4 is a flowchart illustrating the processing for image correction and mechanical rotation correction.

Referring now to FIG. 4, a description will be given of the flowchart of the image correction and the mechanical rotation correction carried out when the vehicle inclines with respect to the vertical direction. The description will be given of the case where the vehicle height sensors 18a and 18b are installed to the pair of step sections 30a and 30b, respectively, of the motorcycle 30 as illustrated in FIG. 2A.

The processing in steps S01 to S03 is the processing carried out by the headlamp control ECU 15 (hereinafter, the reference numeral will be omitted), and the processing of step S04 and after is carried out by the controller 12 (hereinafter, the reference numeral will be omitted).

First, when the vehicle inclines with respect to the vertical direction, the headlamp control ECU acquires the detection signals from the pair of vehicle height sensors (step S01). Thereafter, the procedure proceeds to step S02.

Next, the headlamp control ECU calculates the inclination angle of the vehicle with respect to the vertical direction (step S02 corresponding to the inclination angle calculation processing in the present invention). When the motorcycle 30 inclines with respect to the vertical direction, the detection signals from the vehicle height sensors 18 indicate different distance values. Hence, the inclination angle of the vehicle with respect to the vertical direction can be calculated by using the placement distances of the sensors. Thereafter, the procedure proceeds to step S03.

Next, the headlamp control ECU calculates the light distribution rotation angle $R_O$ (step S03). The light distribution rotation angle $R_O$ denotes the desired value of the rotation angle for carrying out the image correction and the mechanical rotation correction. Thereafter, the procedure proceeds to step S04.

Next, the controller determines whether the rotation angle $R_O$ acquired from the headlamp control ECU is larger than a threshold value (step S04 corresponding to the threshold value determination processing in the present invention). The threshold value can be set as appropriate to, for example, 5°.

First, a description will be given of a case where the determination in step S04 is YES. The controller calculates a desired motor rotation angle $R_M$ (step S05 corresponding to the second correction value calculation processing in the present invention). The desired motor rotation angle $R_M$ is a desired rotation angle for the mechanical rotation correction by the motor 10. Thereafter, the procedure proceeds to step S06.

Next, the controller transmits the information of the rotation angle $R_M$ (a motor driving signal corresponding to the second correction driving signal in the present invention) to the second driving circuit 14b (step S06 corresponding to the rotation correction processing in the present invention). Thus, the mechanical rotation correction is carried out by the motor 10, and the inclination of the light distribution pattern is mechanically restored. Thereafter, the procedure proceeds to step S07.

Next, the controller calculates a light distribution rotation angle $R_P$ (step S07 corresponding to the second correction value calculation processing in the present invention). The rotation angle $R_P$ is given as a current motor rotation angle $r_M$ according to the following expression.

$$R_P = R_M - r_M \qquad \text{(Expression 1)}$$

For example, if the desired motor rotation angle $R_M$ is 30° and the current motor rotation angle $r_M$ is 20°, then $R_P=10°$. This means that, when the illuminatable area D is rotated as the motor 10 rotates, the light distribution pattern also rotates, so that setting the light distribution pattern back by the remaining angle (10°) causes the light distribution pattern to return to the horizontal state.

Next, the controller calculates the luminance distribution for the rotation angle $R_P$ (step S08 corresponding to the light distribution calculation processing in the present invention. More specifically, the controller acquires the luminance distribution information of the current light distribution pattern from the light distribution storage memory 13 and then calculates a new luminance distribution. Then, the procedure proceeds to step S09.

Next, the controller transmits the information of the rotation angle $R_P$ (the LD driving signal and the light deflector driving signal, which correspond to the second correction driving signal in the present invention) to the first driving circuit 14a (step S09 corresponding to the light distribution generation processing in the present invention). Thus, the image correction is carried out by driving the LD 6 and the light deflector 7 to regenerate the light distribution pattern.

Lastly, a description will be given of the case where the determination in step S04 is NO (the first correction processing in the present invention). In this case, the controller calculates the luminance distribution for the rotation angle $R_O$ (step S10 corresponding to the light distribution calculation processing in the present invention) and transmits the information of the rotation angle $R_O$ to the first driving circuit 14a (step S11 corresponding to the light distribution generation processing in the present invention).

More specifically, if the rotation angle $R_O$ is equal to or smaller than a threshold value (e.g. 5°), then the inclination of the light distribution pattern is corrected by the image correction alone. Since the image correction is processed faster than the mechanical rotation correction, only the image correction is carried out in the case where the rotation angle $R_O$ is small. If the inclination is corrected by carrying out only the image correction, then the illuminatable area D may remain in an inclined state. This completes the series of processing carried out in the case where the vehicle is inclined with respect to the vertical direction.

An inclination of the vehicle at a high angular velocity cannot be dealt with by the mechanical rotation correction by the motor 10, either. In this case, the inclination of the light distribution pattern is corrected by the image correction. In the foregoing step S04, whether the angular velocity at the time of an inclination is a predetermined value or more may be established as a determination condition or as one of multiple determination conditions.

As described above, even if a vehicle is considerably inclined with respect to the vertical direction, the vehicle lamp tool 1 according to the present invention can promptly correct the inclination of a light distribution pattern by carrying out the image correction and the mechanical rotation correction. Although the inclination of a light distribution pattern can be corrected by the mechanical rotation correction alone, it takes a longer time because the motor 10 is used. However, the image correction is simultaneously carried out, thus enabling the light distribution pattern to follow the inclination of a vehicle without delay.

Further, in the case where a road itself has an inclination (bank angle), the vehicle lamp tool 1 according to the present invention can horizontalize the light distribution pattern. Depending on the bank angle, a two-wheeled vehicle inclines almost 90° with respect to the vertical direction. The positions of the gyro sensors are not limited to the step sections of the two-wheeled vehicle and are preferably installed at highest possible positions above a road surface.

Preferably, the motor 10 is installed, covering the periphery of the vehicle lamp tool 1, and is configured to rotate by ±90°. With this arrangement, even if the two-wheeled vehicle is considerably inclined with respect to the vertical direction, the inclination of the light distribution pattern can be corrected.

The interior of the optical device 2 is not limited to that of the embodiment illustrated in FIG. 1. A condensing lens may be placed between the LD 6 and the light deflector 7, or an arrangement may be made such that laser light that has passed the condensing lens is irradiated to a fluorescent body, and the fluorescence enters the light deflector 7. Further, in place of the light deflector 7, a digital mirror device in which mirror elements are arranged in a matrix may be used.

DESCRIPTION OF REFERENCE NUMERALS

1 . . . vehicle lamp tool; 2 . . . optical device; 3 . . . control device; 4 . . . sensor unit; 7 . . . light deflector; 8 . . . fluorescent body; 9 . . . projection lens; 10 . . . motor; 12 . . . controller; 13 . . . light distribution storage memory; 14 . . . driving circuit; 14a . . . first driving circuit; 14b . . . second driving circuit; 15 . . . headlamp control ECU; 17 . . . on-vehicle camera; 18 . . . vehicle height sensor; 18a . . . left vehicle height sensor; 18b right vehicle height sensor; 19 . . . gyro sensor; 30 . . . motorcycle; and 30a, 30b . . . foot rest.

The invention claimed is:

1. A vehicle lamp tool comprising:
a light distribution calculation unit which calculates the luminance distribution of a light distribution pattern generated in an area ahead of a vehicle;
a light distribution generation unit which has a light source, a light deflector composed of a mirror section that reflects light emitted from the light source in a predetermined direction and an actuator which rotates the mirror section about a rotation axis, a fluorescent body which lets the light reflected by the mirror section enter and emits fluorescence, and a projection optical unit which projects the light emitted from the fluorescent body, the light distribution generation unit generating the light distribution pattern in an illumination area, to which the light from the projection optical unit is irradiated, according to the luminance distribution calculated by the light distribution calculation unit, and
a first driving unit which generates a driving signal based on the luminance distribution calculated by the light distribution calculation unit and drives the light distribution generation unit according to the driving signal,
the vehicle lamp tool further comprising:
an inclination angle detection unit which is installed at a predetermined position of a vehicle and detects an inclination angle of the vehicle with respect to a vertical direction,
wherein the light distribution calculation unit transmits a first light distribution correction signal for correcting the inclination of a current light distribution pattern to the first driving unit in the case where the inclination angle of a detection signal received from the inclination angle detection unit is equal to or less than a predetermined threshold value,
the first driving unit transmits a first correction driving signal based on the first light distribution correction signal to the light distribution generation unit, and
the light distribution generation unit drives the light source and the light deflector based on the first correction driving signal thereby to correct the current light distribution pattern.

2. The vehicle lamp tool according to claim 1, further comprising:
mechanical rotation unit which is installed to the light distribution generation unit and which rotates the light distribution generation unit; and
a second driving unit which drives the mechanical rotation unit,
wherein the light distribution calculation unit transmits a second light distribution correction signal for correcting the inclination of a current light distribution pattern to the first driving unit and the second driving unit in the case where the inclination angle of the detection signal received from the inclination angle detection unit is larger than the threshold value,
the first driving unit and the second driving unit transmit a second correction driving signal based on the second light distribution correction signal to the light distribution generation unit, and
the light distribution generation unit drives the light source, the light deflector, and the mechanical rotation unit according to the second correction driving signal to correct the current light distribution pattern.

3. The vehicle lamp tool according to claim 1,
wherein, in the case where the vehicle is a two-wheeled vehicle, the inclination angle detection unit is composed of a pair of vehicle height sensors which are installed to footrests on which both feet of a rider are placed and which detect the distance between the installation positions of the inclination angle detection unit and a road surface.

4. The vehicle lamp tool according to claim 1,
wherein the inclination angle detection unit includes gyro sensors installed on the left and right central axes of the vehicle.

5. The vehicle lamp tool according to claim 2,
wherein, in the case where the vehicle is a two-wheeled vehicle, the inclination angle detection unit is composed of a pair of vehicle height sensors which are installed to footrests on which both feet of a rider are placed and which detect the distance between the installation positions of the inclination angle detection unit and a road surface.

6. The vehicle lamp tool according to claim 2,
wherein the inclination angle detection unit includes gyro sensors installed on the left and right central axes of the vehicle.

7. A method for controlling a vehicle lamp tool, the method comprising:
- light distribution calculation processing for calculating the luminance distribution of a light distribution pattern generated in an area ahead of a vehicle;
- light distribution generation processing for generating the light distribution pattern according to the luminance distribution calculated by the light distribution calculation processing in an illumination area to which light is irradiated;
- inclination angle calculation processing for calculating an inclination angle of a vehicle with respect to the vertical direction;
- threshold value determination processing for determining whether the inclination angle acquired by the inclination angle calculation processing is equal to or less than a predetermined threshold value; and
- first correction processing for correcting, as a first correction value for correcting the inclination of the light distribution pattern, the inclination angle acquired by the inclination angle calculation processing in the case where a determination result of the threshold value determination processing is equal to or less than the threshold value,
- wherein the light distribution calculation processing and the light distribution generation processing are carried out based on the first correction value thereby to correct the light distribution pattern in the first correction processing.

8. The method for controlling a vehicle lamp tool according to claim 7, further comprising:
- rotation correction processing for correcting the inclination of the light distribution pattern by the rotation of mechanical rotation unit; and
- second correction value calculation processing for calculating a second correction value for correcting the inclination of the light distribution pattern in the case where a determination result of the threshold value determination processing is larger than the threshold value,
- wherein the light distribution calculation processing, the light distribution generation processing, and the rotation correction processing are carried out based on the second correction value calculated by the second correction value calculation processing so as to correct the light distribution pattern.

* * * * *